United States Patent
Nishioka et al.

(10) Patent No.: US 12,227,232 B2
(45) Date of Patent: Feb. 18, 2025

(54) PHASE ADJUSTMENT METHOD, CORRECTION VALUE CALCULATION DEVICE, MOTOR CONTROL DEVICE, ELECTRIC ACTUATOR PRODUCT, AND ELECTRIC POWER STEERING DEVICE

(71) Applicant: NSK LTD., Tokyo (JP)

(72) Inventors: Yusuke Nishioka, Maebashi (JP); Yoshihiro Aosaki, Fujisawa (JP); Hiroyuki Yamamura, Tokyo (JP)

(73) Assignee: NSK LTD., Tokyo (JP)

( * ) Notice: Subject to any disclaimer, the term of this patent is extended or adjusted under 35 U.S.C. 154(b) by 734 days.

(21) Appl. No.: 17/435,248

(22) PCT Filed: Dec. 16, 2020

(86) PCT No.: PCT/JP2020/047012
§ 371 (c)(1),
(2) Date: Aug. 31, 2021

(87) PCT Pub. No.: WO2021/161650
PCT Pub. Date: Aug. 19, 2021

(65) Prior Publication Data
US 2022/0135120 A1    May 5, 2022

(30) Foreign Application Priority Data
Feb. 13, 2020 (JP) .................. 2020-022305

(51) Int. Cl.
*H02P 21/24* (2016.01)
*B62D 5/04* (2006.01)
(Continued)

(52) U.S. Cl.
CPC ............. *B62D 5/0463* (2013.01); *G01B 7/30* (2013.01); *G01D 5/16* (2013.01); *G01P 3/487* (2013.01); *H02P 23/14* (2013.01); *H02P 25/03* (2016.02)

(58) Field of Classification Search
CPC .................................. H02P 8/22; H02P 21/36
See application file for complete search history.

(56) References Cited

U.S. PATENT DOCUMENTS

2014/0285125 A1* 9/2014 Kato ..................... H02P 21/141
                                                                318/721
2018/0093702 A1* 4/2018 Nampei ............... B62D 5/0487
(Continued)

FOREIGN PATENT DOCUMENTS

JP    2004-274855 A    9/2004
JP    2008-099369 A    5/2006
(Continued)

OTHER PUBLICATIONS

Communication dated Aug. 2, 2022 from the Japanese Patent Office in Application No. 2021-531503.
(Continued)

*Primary Examiner* — Kawing Chan
*Assistant Examiner* — Charles S Laughlin
(74) *Attorney, Agent, or Firm* — Sughrue Mion, PLLC

(57) ABSTRACT

A phase adjustment method for a rotation angle sensor configured to detect a rotation angle of a rotor of a brushless motor, the phase adjustment method including: measuring a first rotation speed and a second rotation speed when the brushless motor is driven with a same torque command current to rotate clockwise and counterclockwise, respectively, on a basis of the rotation angle of the rotor detected by the rotation angle sensor; and calculating a correction value to correct a phase of the rotation angle sensor so that
(Continued)

a rotation speed difference between the first rotation speed and the second rotation speed decreases.

9 Claims, 15 Drawing Sheets

(51) Int. Cl.
*G01B 7/30* (2006.01)
*G01D 5/16* (2006.01)
*G01P 3/487* (2006.01)
*H02P 6/18* (2016.01)
*H02P 23/14* (2006.01)
*H02P 25/03* (2016.01)

(56) References Cited

U.S. PATENT DOCUMENTS

2018/0229764 A1   8/2018  Sugawara et al.
2018/0351484 A1*  12/2018 Mizuo .................. H02P 6/24
2019/0291775 A1*  9/2019  Taki .................... B62D 5/046

FOREIGN PATENT DOCUMENTS

| JP | 2013-042662 A | 2/2013 |
| JP | 2015-159709 A | 9/2015 |
| JP | 2018-088810 A | 6/2018 |

OTHER PUBLICATIONS

International Search Report for PCT/JP2020/047012 dated Feb. 16, 2021 PCT/ISA/210].
Written Opinion for PCT/JP2020/047012 dated Feb. 16, 2021 PCT/ISA/237].
International Preliminary Report on Patentability dated Aug. 11, 2022 with a Translation of the Written Opinion of the International Searching Authority in Application No. PCT/JP2020/047012.
Supplementary European Search Report dated Apr. 13, 2022 from the European Patent Office in EP Application No. 20919127.9.
Office Action dated May 23, 2022 from the European Patent Office in EP Application No. 20919127.9.
Chinese Office Action issued Nov. 16, 2023 in Application No. 202080017721.7.

* cited by examiner

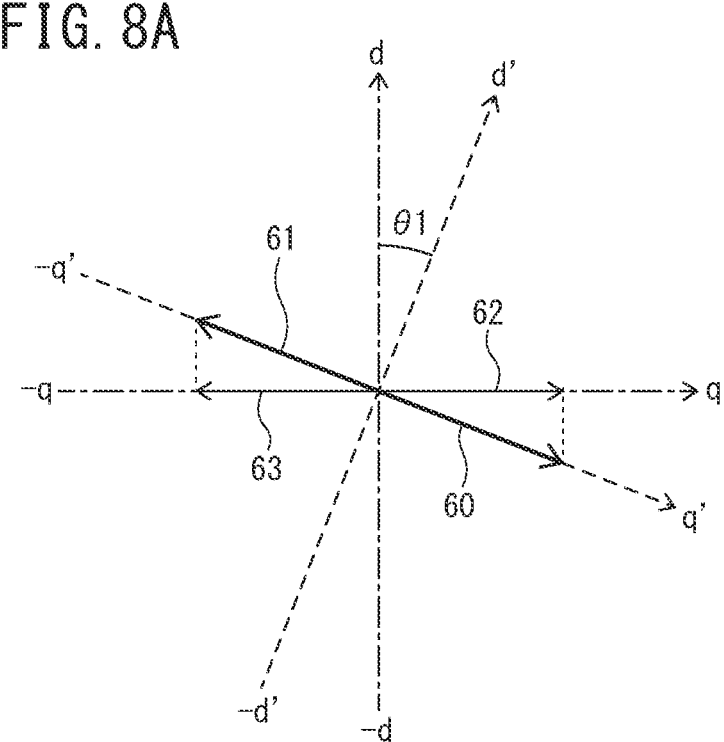

PHASE ADJUSTMENT METHOD, CORRECTION VALUE CALCULATION DEVICE, MOTOR CONTROL DEVICE, ELECTRIC ACTUATOR PRODUCT, AND ELECTRIC POWER STEERING DEVICE

CROSS REFERENCE TO RELATED APPLICATIONS

This application is a National Stage of International Application No. PCT/JP2020/047012 filed Dec. 16, 2020, claiming priority based on Japanese Patent Application No. 2020-022305 filed Feb. 13, 2020.

TECHNICAL FIELD

The present invention relates to a phase adjustment method, a correction value calculation device, a motor control device, an electric actuator product, and an electric power steering device.

BACKGROUND ART

In order to control the drive current of a brushless motor such as a brushless DC motor or an AC servomotor, angle information acquired by a rotation angle sensor that detects the rotation angle of a rotor of the motor needs to be in a previously assumed phase relationship with the phase of the rotor (e.g., an electric angle of the rotor). In other words, since the motor is controlled on the basis of the angle information of the rotation angle sensor, matching a rotation angle reference of the rotor with a rotation angle reference of the rotation angle sensor enables highly accurate control.

As a technology for adjusting a phase difference between the rotor of a brushless motor and a phase detector that detects the phase of the rotor, an adjustment method described in PTL 1 below is known. The adjustment method described in PTL 1 performs motor pole phase adjustment by means of step A1 of rotationally driving the rotor from a predetermined angle within a mechanical angle of 180° in a CW direction with respect to a stable point to the stable point in a CCW direction, step A2 of measuring a drive distance B1 in step A1, step A3 of rotationally driving the rotor from a predetermined angle within a mechanical angle of 180° in the CCW direction with respect to the stable point to the stable point in the CW direction, step A4 of measuring a drive distance B2 in step A3, and step A5 of obtaining an excitation origin on the basis of the drive distances B1 and B2.

CITATION LIST

Patent Literature

PTL 1: JP 2013-42662 A

SUMMARY OF INVENTION

Technical Problem

However, in the adjustment method described in PTL 1, the rotor is affected by frictional resistance and the like when stopping the rotor at the stable point, due to which an error occurs between the actually stopped point and the stable point, and highly accurate adjustment is difficult.

The present invention has been made in view of such a problem. It is an object of the present invention to achieve highly accurate phase adjustment of a rotation angle sensor detecting a rotation angle of the rotor of a brushless motor, without having to perform complicated computation.

Solution to Problem

According to an aspect of the present invention, there is provided a phase adjustment method for a rotation angle sensor configured to detect a rotation angle of a rotor of a brushless motor, the phase adjustment method including: measuring a first rotation speed and a second rotation speed when the brushless motor is driven with a same torque command current to rotate clockwise and counterclockwise, respectively, on a basis of the rotation angle of the rotor detected by the rotation angle sensor; and calculating a correction value to correct a phase of the rotation angle sensor so that a rotation speed difference between the first rotation speed and the second rotation speed decreases.

According to another aspect of the present invention, there is provided a correction value calculation device configured to calculate a correction value to adjust a phase of a rotation angle sensor configured to detect a rotation angle of a rotor of a brushless motor, the correction value calculation device including: a motor control unit configured to drive the brushless motor on a basis of the rotation angle of the rotor detected by the rotation angle sensor; a rotation speed difference calculation unit configured to calculate a rotation speed difference between a first rotation speed and a second rotation speed when the brushless motor is driven with a same torque command current by the motor control unit to rotate clockwise and counterclockwise, respectively; and a calculation unit configured to calculate the correction value to correct the phase of the rotation angle sensor so that the rotation speed difference decreases.

According to still another aspect of the present invention, there is provided a motor control device including a rotation angle sensor configured to detect a rotation angle of a rotor of a brushless motor and the correction value calculation device described above configured to calculate a correction value to adjust a phase of the rotation angle sensor, wherein the motor control unit of the correction value calculation device corrects the rotation angle sensor according to the correction value calculated by the calculation unit, and drives the brushless motor.

According to yet another aspect of the present invention, there is provided an electric actuator product comprising the motor control device described above and a brushless motor controlled by the motor control device.

According to a further aspect of the present invention, there is provided an electric power steering device comprising the motor control device described above and a brushless motor controlled by the motor control device, the brushless motor applying a steering assistance force to a vehicle steering system.

Advantageous Effects of Invention

According to the present invention, it is possible to achieve highly accurate phase adjustment of a rotation angle sensor detecting a rotation angle of the rotor of a brushless motor, without having to perform complicated computation.

BRIEF DESCRIPTION OF DRAWINGS

FIG. 8A is an illustrative diagram illustrating why the rotation speed difference occurs;

DESCRIPTION OF EMBODIMENTS

Embodiments of the present invention will be described in detail with reference to the drawings.

Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment (Configuration)

Figure 1:
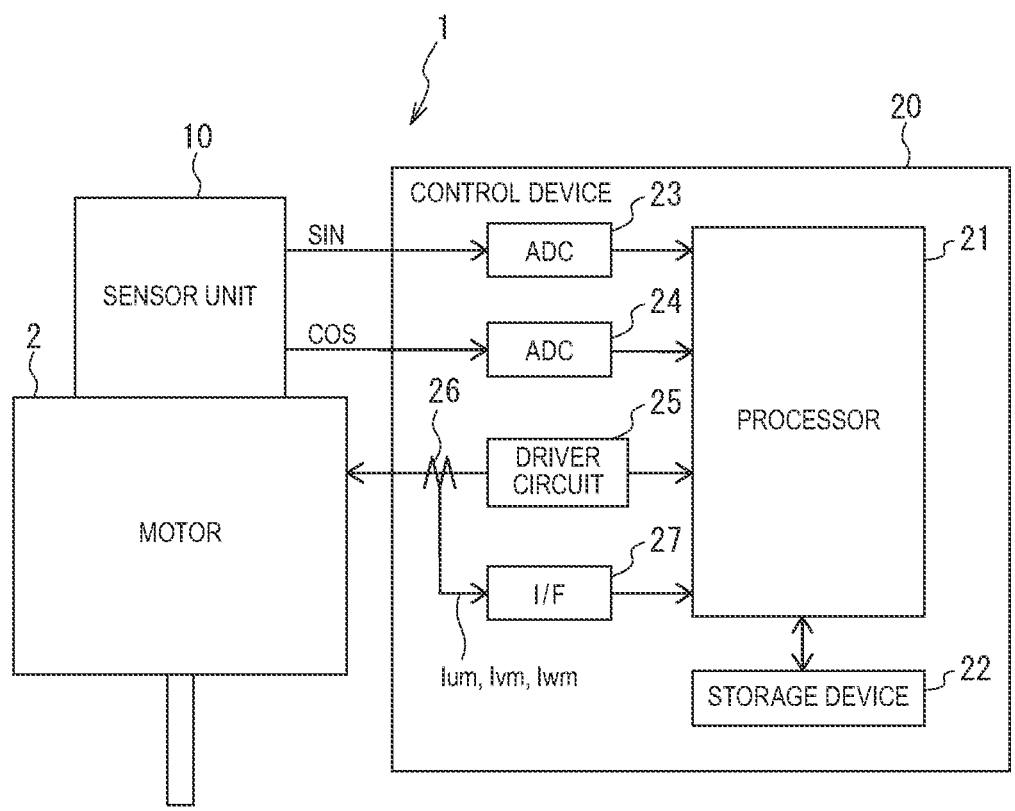
FIG. 1 is a schematic configuration diagram of an example of a motor control device according to an embodiment.

Reference is made to FIG. 1. A motor control device 1 of an embodiment includes a sensor unit 10, which is a rotation angle sensor configured to detect a rotation angle of a rotor of a motor 2 being a brushless motor such as a brushless DC motor or an AC servomotor, and a control device 20, which is an electronic control unit (ECU) configured to drive the motor 2 on the basis of the rotation angle detected by the sensor unit 10.

The following is a description of a case where the sensor unit 10 is a sensor that outputs a sine signal SIN=sin θm and a cosine signal COS=cos θm according to a rotation angle θm of the rotor of the motor 2. However, a sensor of the type to which the present invention is to be applied is not limited to such a sensor. The present invention is applicable to various forms of rotation angle sensors configured to detect the rotation angle of a brushless motor.

Figure 2:
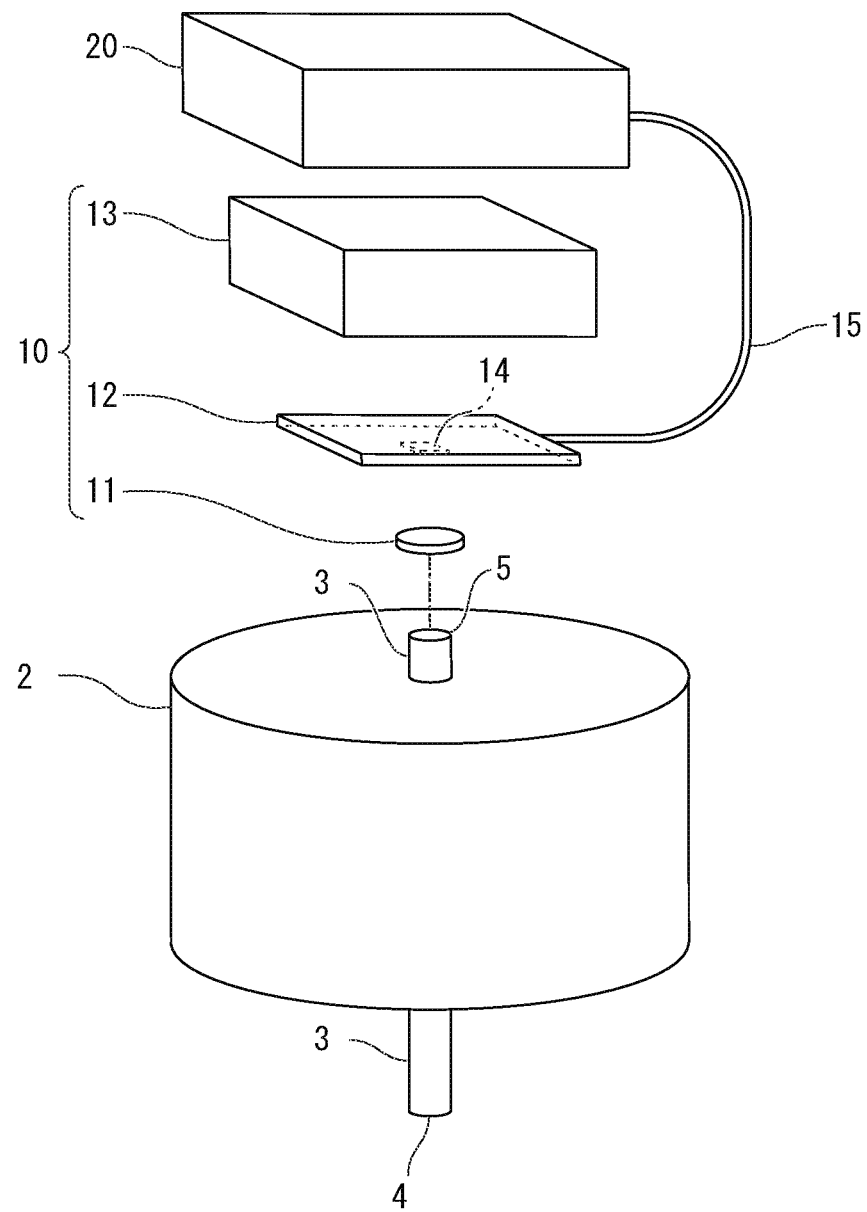
FIG. 2 is an exploded diagram illustrating an overview of an example of a sensor unit.

A configuration example of the sensor unit 10 will be described with reference to FIG. 2. The sensor unit 10 includes a magnet 11, a circuit board 12, and a support member 13.

The magnet 11 is fixed to an end portion 5 that is opposite of an output end 4 of a rotating shaft 3 of the motor 2, and has different magnetic poles (S pole and N pole) arranged along a circumferential direction of the rotating shaft 3.

On the circuit board 12, a magnetic resistance (MR) sensor element 14 configured to detect magnetic flux is mounted.

The circuit board 12 is fixed to the support member 13 by unillustrated fixing means. The support member 13 is fixed to the motor 2 by unillustrated fixing means. For example, these fixing means may be, for example, fastening means such as screws, caulking, or the like.

A position where the circuit board 12 is fixed to the support member 13 and a position where the support member 13 is fixed to the motor 2 are determined so that the circuit board 12 is arranged between the support member 13 and the motor 2 and the MR sensor element 14 is close to the magnet 11 when the circuit board 12 is fixed to the support member 13 and the support member 13 is fixed to the motor 2.

The support member 13 is, for example, a cover that covers the circuit board 12. For example, in FIG. 2, the support member 13 includes a recessed portion opening downward, and the circuit board 12 is fixed in the recessed portion of the support member 13. When the support member 13 is fixed to the motor 2, the opening portion of the recessed portion of the support member 13 is covered by the motor 2, and the circuit board 12 is housed in an internal space defined by the recessed portion of the support member 13 and the motor 2. This protects the circuit board 12 from an external shock and foreign objects.

The support member 13 may be made of a metal with high thermal conductivity, such as an aluminum alloy, and may serve as a heat sink. Additionally, the support member 13 may be a heat sink itself.

The sensor unit 10 and the control device 20 are electrically connected to each other by a harness 15, and the harness 15 transmits a signal between the sensor unit 10 and the control device 20.

Reference is made to FIG. 1. The control device 20 includes a processor 21, a storage device 22, analog-digital converters (ADCs) 23 and 24, a driver circuit 25, a current sensor 26, and an interface (I/F) circuit 27.

The processor 21 may be, for example, a central processing unit (CPU) or a micro-processing unit (MPU).

The storage device 22 may include any of a semiconductor storage device, a magnetic storage device, and an optical storage device. The storage device 22 may include memories, such as register, cache memory, and read only memory (ROM) and random access memory (RAM) used as primary storage.

Functions of the control device 20, which will be described below, are achieved by, for example, allowing the processor 21 to execute a computer program stored in the storage device 22.

The ADCs 23 and 24 convert the sine signal SIN and the cosine signal COS output by the MR sensor element 14 of the sensor unit 10 to digital signals. The processor 21 reads the sine signal SIN and the cosine signal COS converted to the digital signals. The processor 21 generates a control signal for driving the motor 2 on the basis of the sine signal SIN and the cosine signal COS.

The driver circuit 25 supplies a motor current for driving the motor 2 on the basis of the control signal generated by the processor 21. The driver circuit 25 may be, for example, an inverter including switching elements that turn the motor current on and off.

The current sensor 26 detects the motor current. In the present embodiment, the motor 2 is a three-phase motor, and the current sensor 26 detects a U-phase motor current Ium, a V-phase motor current Ivm, and a W-phase motor current Iwm. Note that a motor of the type to which the present invention is to be applied is not limited to a three-phase motor. The present invention is applicable to motors with various numbers of phases.

The processor 21 reads detection values of the U-phase motor current Ium, the V-phase motor current Ivm, and the W-phase motor current Iwm via the I/F circuit 27.

Next, a functional configuration of the control device 20 will be described with reference to FIG. 3. The control device 20 includes a rotation angle measurement unit 30, a correction unit 31, a motor control unit 32, and a correction value calculation unit 33. The motor control unit 32 and the correction value calculation unit 33 are one example of a "correction value calculation device" described in the claims.

The rotation angle measurement unit 30 calculates a detection angle $\theta c$ being a detection value of the rotation angle $\theta m$ of the rotor of the motor 2 on the basis of the sine signal SIN and the cosine signal COS.

Figure 4:
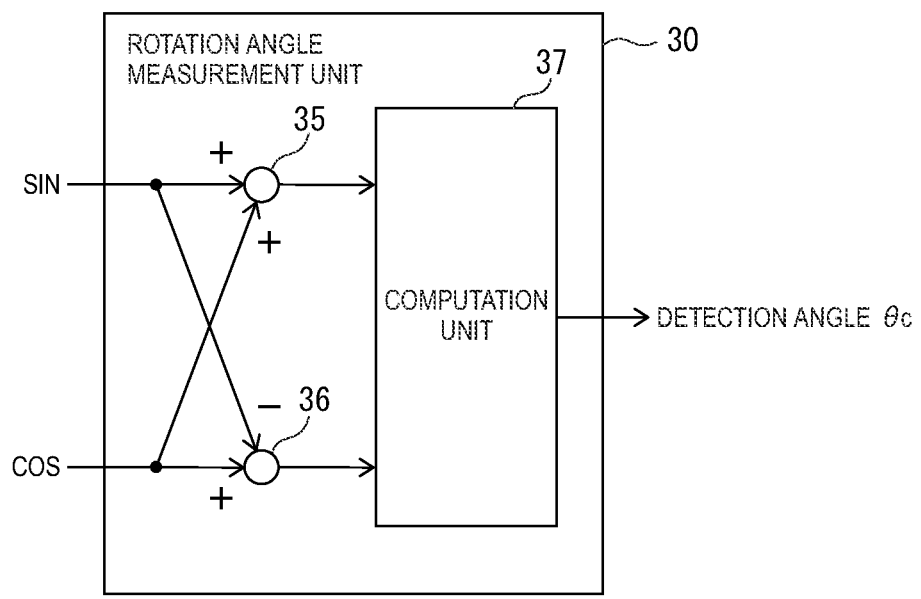
FIG. 4 is an illustrative diagram illustrating an example of a functional configuration of a rotation angle measurement unit.

Reference is made to FIG. 4. The rotation angle measurement unit 30 includes an adder 35, a subtractor 36, and a computation unit 37.

The computation unit 37 computes the detection angle $\theta c$ of the rotor of the motor 2 on the basis of an output (COS+SIN) of the adder 35 and an output (COS−SIN) of the subtractor 36.

Figure 3:
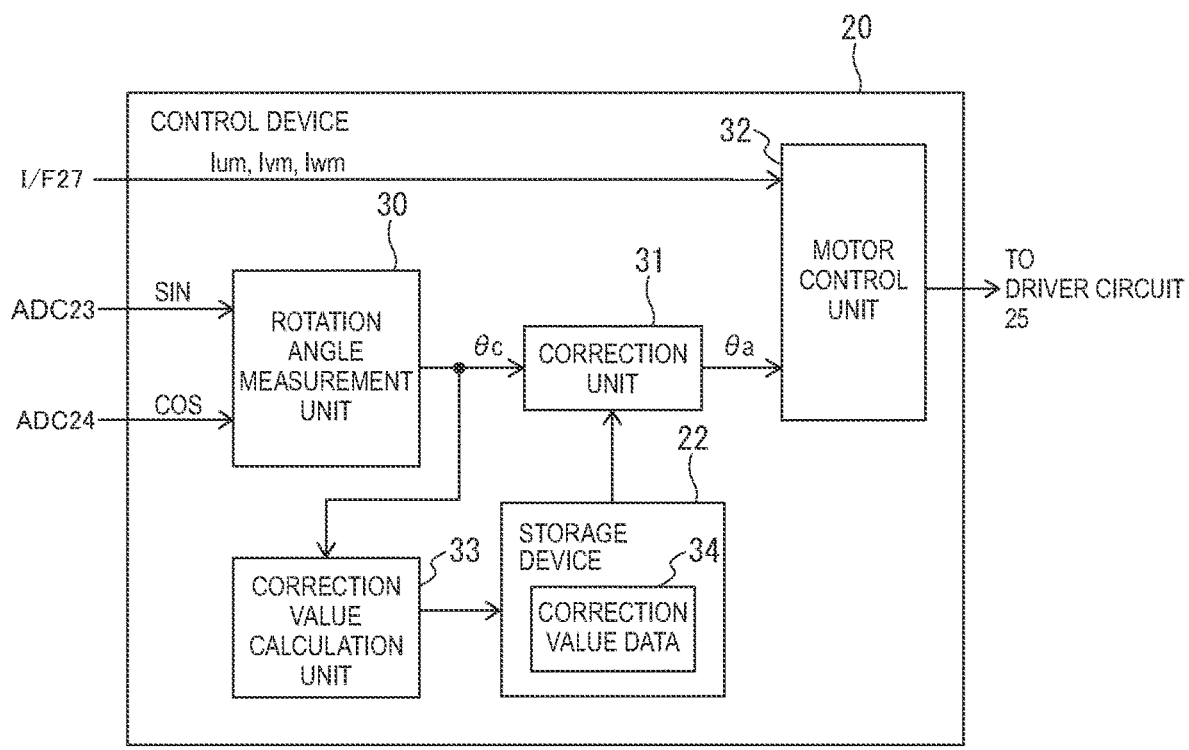
FIG. 3 is an illustrative diagram illustrating an example of a functional configuration of a control device.

Reference is made to FIG. 3. The correction unit 31 corrects the detection angle $\theta c$ so as to compensate for a misalignment between the detection angle $\theta c$ computed on the basis of the detection signal of the MR sensor element 14 and a phase of the rotor (e.g., an electric angle of the rotor) of the motor 2, and calculates a corrected rotation angle $\theta a$.

Figure 5:
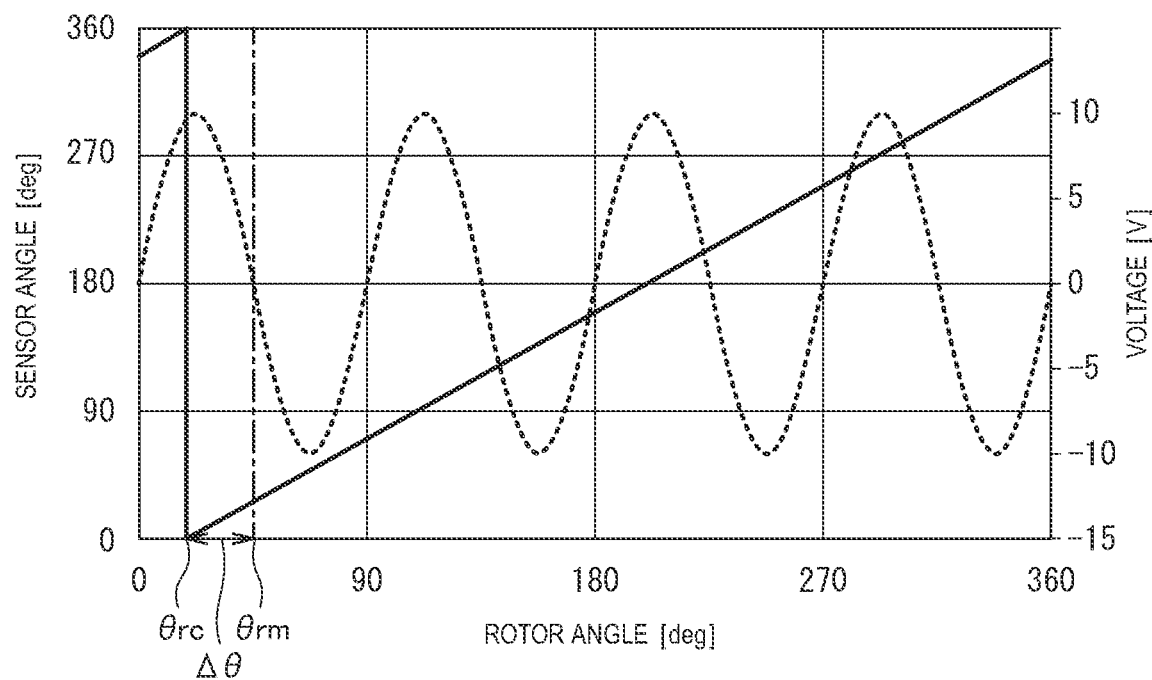
FIG. 5 is an illustrative diagram illustrating an angular misalignment amount between a rotation angle reference of a rotor of a motor and a rotation angle reference of the sensor unit.

FIG. 5 will be referenced to describe a misalignment (hereinafter may be referred to as "angular misalignment amount") $\Delta\theta$ between the detection angle $\theta c$ and the phase of the rotor. A solid line indicates the detection angle $\theta c$, and a dashed line indicates a U-phase induced voltage of the motor 2. FIG. 5 exemplifies a U-phase induced voltage waveform of a four-pole pair motor.

For example, the angular misalignment amount $\Delta\theta$ is given as a difference ($\Delta\theta=\theta rc-\theta rm$) between a rotor mechanical angle $\theta rm$ when the rotation angle of the rotor is a predetermined rotor-side rotation angle reference and a rotor mechanical angle $\theta rc$ when the detection angle $\theta c$ is a predetermined sensor-side rotation angle reference. The rotor-side rotation angle reference may be a predetermined mechanical angle of the rotor, for example, a rising point or a falling point of induced voltage (a zero crossing point of induced voltage), or a predetermined electric angle of the rotor (e.g., 0 [deg]). The sensor-side rotation angle reference may be, for example, a predetermined detection angle $\theta c$ (e.g., 0 [deg]).

Reference is made to FIG. 3. The storage device 22 (see FIG. 1) stores correction value data 34 that indicates a correction value C for compensating for the angular misalignment amount $\Delta\theta$ of angular misalignment. The correction value C may be, for example, a value equal to the angular misalignment amount $\Delta\theta$.

The correction unit 31 reads the correction value data 34 from the storage device 22, and subtracts the correction value C from the detection angle $\theta c$ to calculate a corrected rotation angle $\theta a$ ($\theta a=\theta c-C=\theta c-\Delta\theta$). The correction unit 31 outputs the corrected rotation angle $\theta a$ to the motor control unit 32.

On the other hand, the motor control unit 32 also receives the detection values of the motor currents Ium, Ivm, and Iwm detected by the current sensor 26.

The motor control unit 32 generates a control signal for driving the motor 2 via the driver circuit 25 on the basis of the corrected rotation angle $\theta a$ and the motor currents Ium, Ivm, and Iwm.

Figure 6:
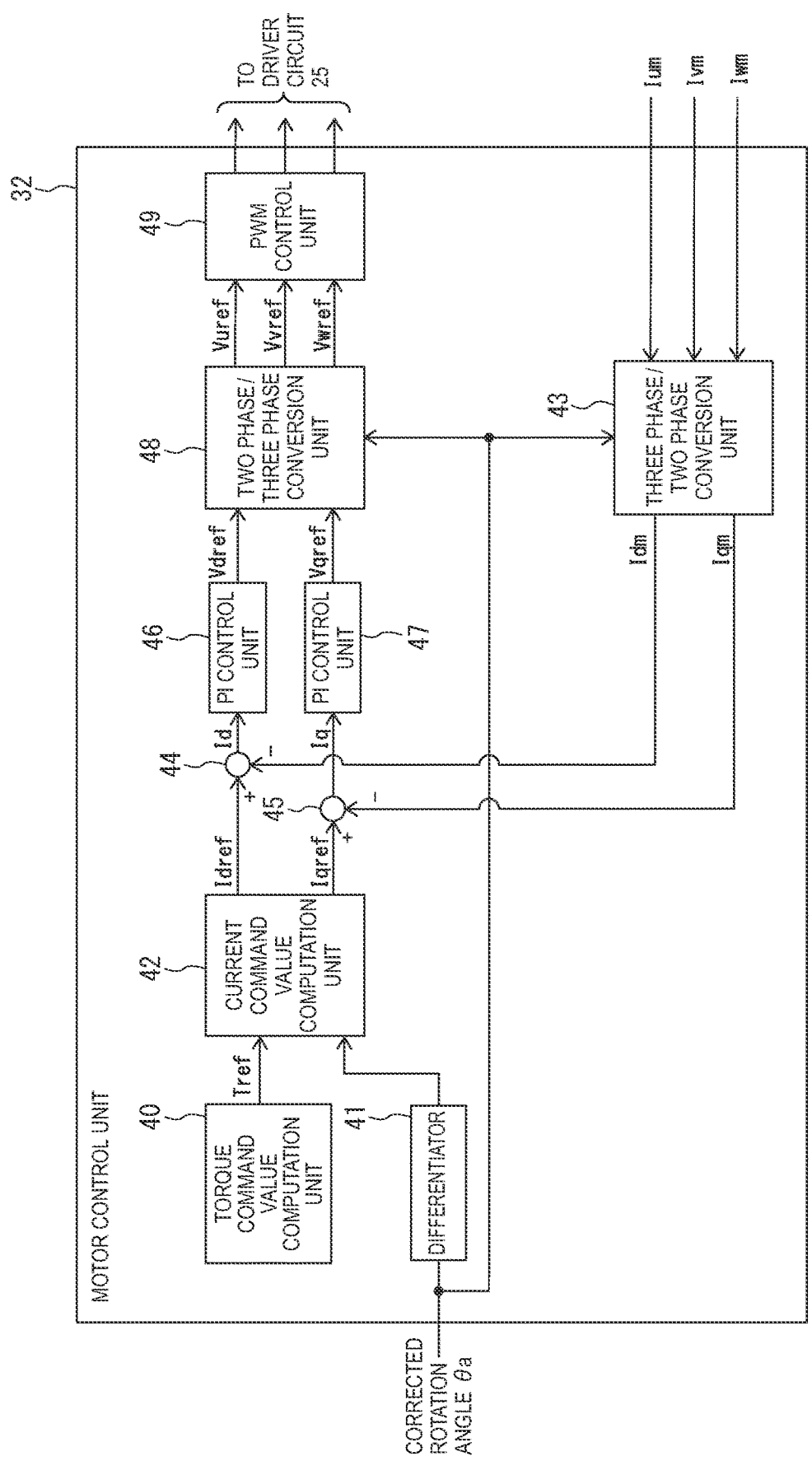
FIG. 6 is an illustrative diagram illustrating an example of a functional configuration of a motor control unit.

A functional configuration of the motor control unit 32 will be described with reference to FIG. 6. The motor control unit 32 includes a torque command value computation unit 40, a differentiator 41, a current command value computation unit 42, a three-phase/two-phase conversion unit 43, subtractors 44 and 45, proportional integration (PI) control units 46 and 47, a two-phase/three-phase conversion unit 48, and a pulse width modulation (PWM) control unit 49.

The torque command value computation unit 40 computes a torque command value Tref of a target torque to be generated according to the application of the motor 2. For example, when the motor 2 is provided in an electric power steering device and applies a steering assistance force to a vehicle steering system, the torque command value computation unit 40 uses an assist map to calculate the torque command value Tref on the basis of a steering torque and a vehicle speed.

The differentiator 41 differentiates the corrected rotation angle $\theta a$ to calculate a rotation speed (rotational angular velocity) $\omega e$ of the motor 2.

The current command value computation unit 42 uses the torque command value Tref and the rotation speed $\omega e$ to calculate a d-axis current command value Idref and a q-axis current command value Iqref.

The three-phase/two-phase conversion unit 43 uses the corrected rotation angle $\theta a$ to covert the motor currents Ium, Ivm, and Iwm to two-phase currents. Specifically, the three-phase motor currents are converted to a d-axis motor current Idm and a q-axis motor current Iqm, which are two-phase currents.

The subtractor 44 calculates a deviation Id (=Idref−Idm) between the d-axis current command value Idref and the fed-back d-axis motor current value Idm. The subtractor 45 calculates a deviation Iq (=Iqref−Iqm) between the q-axis current command value Iqref and the fed-back q-axis motor current value Iqm.

The PI control unit 46 obtains a d-axis voltage command value Vdref on the basis of the deviation Id between the d-axis current command value Idref and the d-axis motor current Idm. Similarly, the PI control unit 47 obtains a q-axis voltage command value Vqref on the basis of the deviation Iq between the q-axis current command value Iqref and the q-axis motor current Iqm.

The two-phase/three-phase conversion unit 48 uses the corrected rotation angle $\theta a$ to convert a two-phase voltage including the d-axis voltage command value Vdref and the q-axis voltage command value Vqref to a three-phase voltage (a U-phase voltage command value Vuref, a V-phase voltage command value Vvref, and a W-phase voltage command value Vwref) by space vector modulation (space vector conversion).

The PWM control unit 49 generates a control signal for controlling the driver circuit 25 by PWM control on the basis of the U-phase voltage command value Vuref, the V-phase voltage command value Vvref, and the W-phase voltage command value Vwref.

Reference is made to FIG. 3. The correction value calculation unit 33 calculates the correction value C for compensating for angular misalignment between the detection angle θc and the phase of the rotor on the basis of the detection angle θc computed from the sine signal SIN and the cosine signal COS by the rotation angle measurement unit 30.

Hereinafter, a description will be given of an overview of a method for calculating the correction value C by the correction value calculation unit 33.

Figure 7:
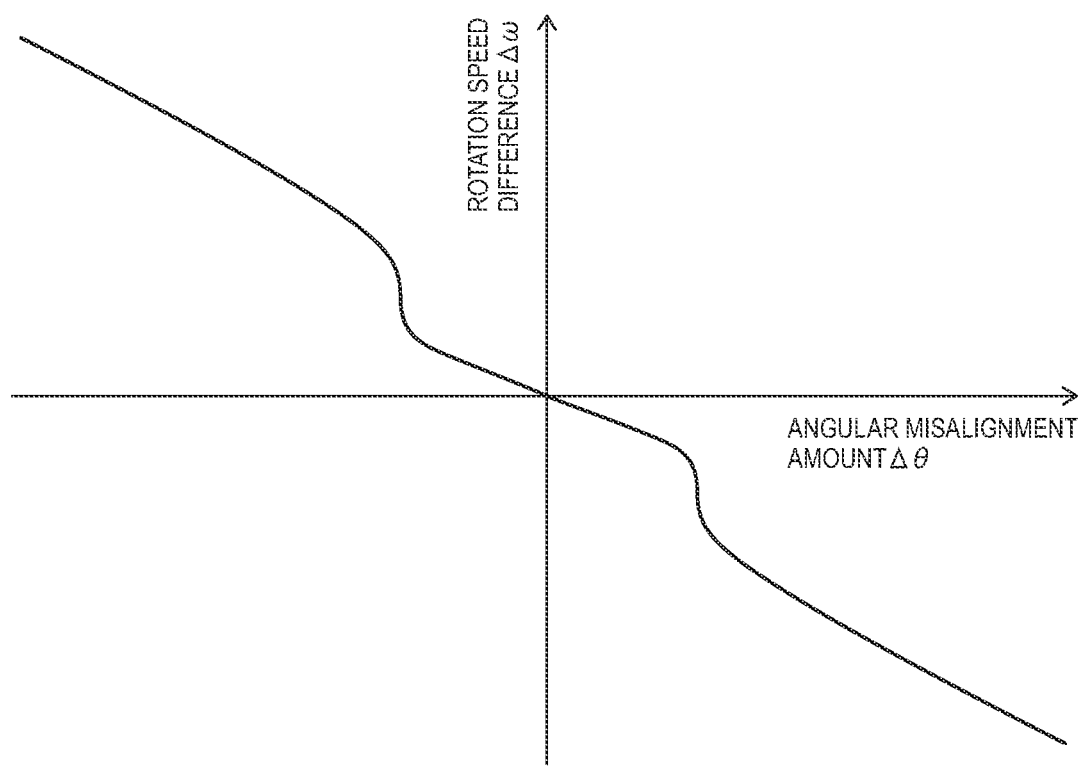
FIG. 7 is an illustrative diagram illustrating a relationship between a rotation speed difference between a rotation speed in a clockwise direction and a rotation speed in a counter-clockwise direction and the angular misalignment amount.

FIG. 7 is a diagram illustrating one example of a relationship between a rotation speed difference Δω (Δω=ωcc−ωc) between respective rotation speeds ωc and ωcc when the motor 2 is driven with the same torque command current to rotate in a clockwise direction and a counterclockwise direction and the angular misalignment amount Δθ. Note that the rotation speed ωc indicates a rotation speed when the motor 2 rotates in the clockwise direction, and the rotation speed ωcc indicates a rotation speed when the motor 2 rotates in the counterclockwise direction.

The inventors of the present application focused on the fact that there is a correlation between the angular misalignment amount Δθ and the rotation speed difference Δω when there is an angular misalignment between the detection angle θc computed on the basis of the detection signal of the MR sensor element 14 and the phase of the rotor of the motor 2.

The reason that the rotation speed difference Δω occurs when an angular alignment occurs will be described with reference to FIGS. 8A and 8B. The coordinate axis of a dashed-dotted line indicates the coordinate axis of a true dq-coordinate system, and the coordinate axis of a dashed line indicates the coordinate axis of a dq-coordinate system with an angular misalignment.

When the detection angle θc and the phase of the rotor are misaligned by θ1 in the case of normal drive (FIG. 8A), a q-axis current command value 60 (torque command current) in the clockwise direction is decomposed into a vector 62 at a cos θ1, and similarly, a q-axis current command value 61 (torque command current) in the counterclockwise direction is decomposed into a vector 63. Magnitudes of q-axis current (the vector 62) in the clockwise direction and −q-axis current (the vector 63) in the counterclockwise direction are equal, so that no rotation speed difference Δω occurs.

Figure 8B:
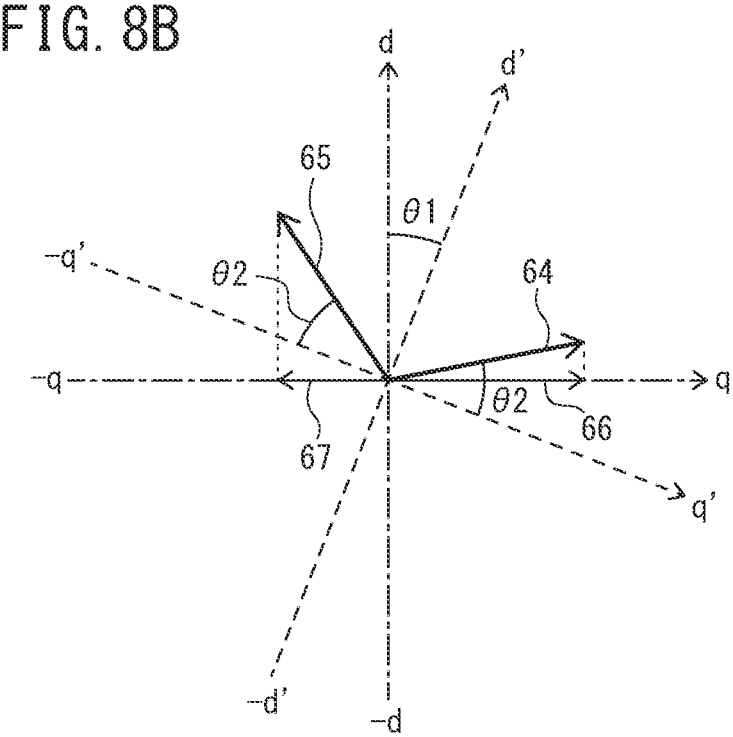
FIG. 8B is an illustrative diagram illustrating why the rotation speed difference occurs.

On the other hand, when performing advance angle control with an advance angle θ2 for field weakening or the like, a current command value 64 in the clockwise direction is decomposed into a vector 66, and a current command value 65 in the counterclockwise direction is decomposed into a vector 67, as illustrated in FIG. 8B. In this case, magnitudes of q-axis current (the vector 66) in the clockwise direction and −q-axis current (the vector 67) in the counterclockwise direction are different, so that the rotation speed difference Δω occurs. At this time, a q'-axis component of the current command value 64, i.e., a torque command current (q'-axis current command value) in the clockwise direction and a q'-axis component of the current command value 65, i.e., a torque command current (q'-axis current command value) in the counterclockwise direction are the same.

As described above, due to the angular misalignment between the detection angle θc computed on the basis of the detection signal of the MR sensor element 14 and the phase of the rotor of the motor 2, the rotation speed difference Δω occurs between the rotation speed ωc in the clockwise direction and the rotation speed ωcc in the counterclockwise direction.

Therefore, the correction value calculation unit 33 measures the rotation speeds ωc and ωcc when the motor 2 is driven with the same torque command current to rotate clockwise and counterclockwise, respectively, and calculates the correction value C so that a rotation speed difference |Δω| between the rotation speeds ωc and ωcc decreases. The rotation speed ωc and the rotation speed ωcc, respectively, are one example of a "first rotation speed" and a "second rotation speed" described in the claims.

Figure 9:
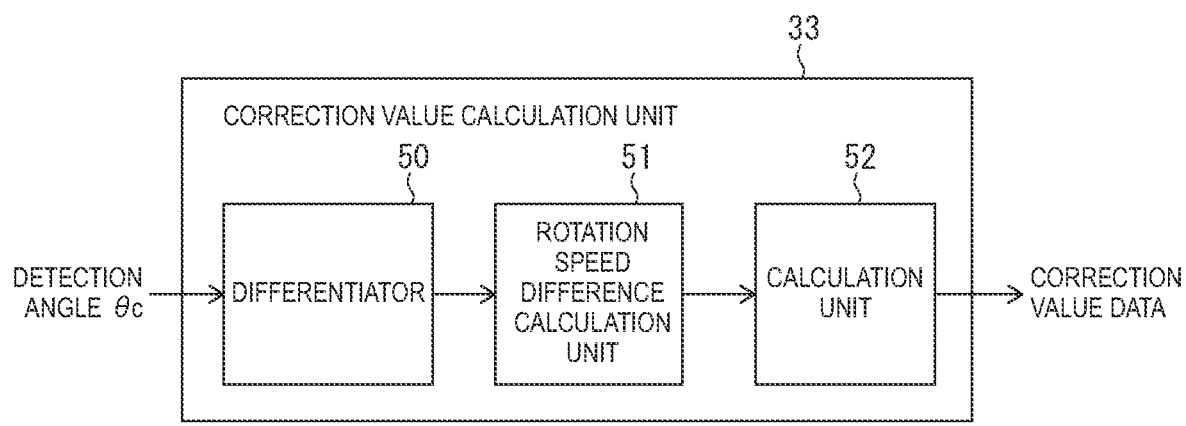
FIG. 9 is an illustrative diagram illustrating an example of a functional configuration of a correction value calculation unit of the first embodiment.

A functional configuration of the correction value calculation unit 33 will be described with reference to FIG. 9. The correction value calculation unit 33 includes a differentiator 50, a rotation speed difference calculation unit 51, and a calculation unit 52.

When calculating the correction value C by the correction value calculation unit 33, the motor control unit 32 drives the motor 2 to rotate clockwise with a predetermined torque command value (i.e., with a predetermined q'-axis current command value) on the basis of the corrected rotation angle θa output from the correction unit 31.

When calculating the correction value C for the first time, the correction unit 31 uses an initial value (e.g., 0 [deg]) of the correction value C to correct the detection angle θc, and outputs the corrected rotation angle θa.

The differentiator 50 differentiates the detection angle θc to calculate the rotation speed ωc of the motor 2 rotating clockwise.

After that, the motor control unit 32 drives the motor 2 to rotate counterclockwise with the same torque command value as when the motor 2 was rotated clockwise (i.e., with the same q'-axis current command value as when the motor 2 was rotated clockwise). The differentiator 50 differentiates the detection angle θc to calculate the rotation speed ωcc of the motor 2 rotating counterclockwise.

Additionally, when rotating the motor 2 clockwise and counterclockwise as above, the motor control unit 32 performs advance angle control on the basis of the corrected rotation angle θa. In addition, when rotating the motor 2 clockwise and counterclockwise as above, the motor control unit 32 may control by setting a d-axis current value for field weakening according to the rotation speed.

Note that the rotation speeds ωc and ωcc may be calculated by using the differentiator 41 (FIG. 6) instead of the differentiator 50 to differentiate the corrected rotation angle θa. Additionally, the order of the clockwise rotation and the counterclockwise rotation may be reversed.

The rotation speed difference calculation unit 51 calculates the rotation speed difference Δω=ωcc−ωc between the rotation speeds ωc and ωcc.

The calculation unit 52 calculates the correction value C so that the rotation speed difference |Δω| between the rotation speeds ωc and ωcc decreases.

For example, as illustrated in FIG. 7, when characteristics of the angular alignment amount Δθ with respect to the rotation speed difference Δω are known, the angular alignment amount Δθ corresponding to the rotation speed difference Δω may be acquired as the correction value C from a characteristic map of the angular alignment amount Δθ with respect to the rotation speed difference Δω.

Alternatively, the correction value C may be calculated by linearly approximating the relationship between the rotation speed difference $\Delta\omega$ and the angular alignment amount $\Delta\theta$ and multiplying the rotation speed difference $\Delta\omega$ by a predetermined coefficient.

The calculation unit 52 stores the calculated correction value C as the correction value data 34 in the storage device 22.

Furthermore, a series of steps including the step of measuring the rotation speeds $\omega$c and $\omega$cc, the step of calculating the rotation speed difference $\Delta\omega$, and the step of calculating the correction value C may be repeated a plurality of times. Alternatively, the series of steps may be repeated a plurality of times until the magnitude $|\Delta\omega|$ of the rotation speed difference $\Delta\omega$ becomes a predetermined threshold value T or less.

Hereinafter, a description will be given of an example of processing when the series of steps is repeated a plurality of times. In the follow description, a clockwise rotation speed and a counterclockwise rotation speed, respectively, measured at an ith time (i represents a natural number) are denoted as a rotation speed $\omega$ci and a rotation speed $\omega$cci. Additionally, a difference ($\omega$cci−$\omega$ci) between the rotation speeds $\omega$ci and $\omega$cci is denoted as an ith-time rotation speed difference $\Delta\omega$i. The correction value C calculated on the basis of the rotation speed difference $\Delta\omega$i is denoted as an ith-time correction value Ci.

When calculating a first-time correction value C1, the value of the correction value data 34 stored in the storage device 22 is initialized to an initial value (e.g., 0 [deg]). Then, the motor 2 is rotated in the clockwise direction and the counterclockwise direction to measure rotation speeds $\omega$c1 and $\omega$cc1 and calculate a first-time rotation speed difference $\Delta\omega$1, thereby calculating the first-time correction value C1. The calculation unit 52 stores the calculated correction value C1 as the correction value data 34 in the storage device 22.

After that, when calculating the rotation speed difference $\Delta\omega$i at the ith time that is a second or later time, the motor control unit 32 rotates the motor 2 in the clockwise direction and the counterclockwise direction on the basis of the corrected rotation angle θa obtained by correcting the detection angle θc with a correction value C (i−1) calculated at an (i−1)th time.

The differentiator 50 calculates rotation speeds at that time as the ith-time rotation speeds $\omega$ci and $\omega$cci, and the rotation speed difference calculation unit 51 calculates the difference ($\omega$cci−$\omega$ci) as the ith-time rotation speed difference $\Delta\omega$i.

The calculation unit 52 calculates an angular misalignment amount $\Delta\theta$i on the basis of the ith-time rotation speed difference $\Delta\omega$i. The angular misalignment amount $\Delta\theta$i is an angular misalignment amount between the corrected rotation angle θa obtained by correcting the detection angle θc with the previously obtained correction value C (i−1) and the phase of the rotor. Therefore, the calculation unit 52 performs correction to add the angular misalignment amount $\Delta\theta$i to the correction value C (i−1), thereby calculating the ith-time correction value Ci. The calculation unit 52 updates the (i−1)th-time correction value C (i−1) stored in the storage device 22 with the calculated correction value Ci.

When calculating the angular misalignment amount $\Delta\theta$i in the calculation of the ith-time correction value Ci, the calculation unit 52 may multiply the ith-time rotation speed difference $\Delta\omega$i by a fixed coefficient to calculate the angular misalignment amount $\Delta\theta$i.

Instead of this, the calculation unit 52 may multiply the rotation speed difference $\Delta\omega$i by a variable coefficient αi to calculate the angular misalignment amount $\Delta\theta$i. For example, the calculation unit 52 may calculate as the variable coefficient αi a ratio (amount of change in correction value C/amount of change in rotation speed difference $\Delta\omega$) of an amount of change in the correction value C to an amount of change in the rotation speed difference $\Delta\omega$.

For example, the calculation unit 52 may calculate as the variable coefficient αi a ratio ((C(i−1)−C(i−2))/($\Delta\omega$i−$\Delta\omega$(i−1))) of an amount of change (C(i−1)−C(i−2)) between a correction value C(i−2) when driving the motor 2 in an (i−1)th-time measurement and a correction value C(i−1) when driving the motor 2 in an ith-time measurement to an amount of change ($\Delta\omega$i−$\Delta\omega$(i−1)) between an (i−1)th-time rotation speed difference $\Delta\omega$(i−1) and an ith-time rotation speed difference $\Delta\omega$i.

Note that when calculating a second-time angular misalignment amount $\Delta\theta$2, the calculation unit 52 uses an initial value (e.g., 0 [deg]) of the correction value C as the correction value C(i−2).

(Operation)

Next, an example of a phase adjustment method of the first embodiment will be described with reference to FIG. 10. Note that in a state where the phase adjustment method is started, the value (correction value C) of the correction value data 34 stored in the storage device 22 is initialized to an initial value (e.g., 0 [deg]).

Figure 11:
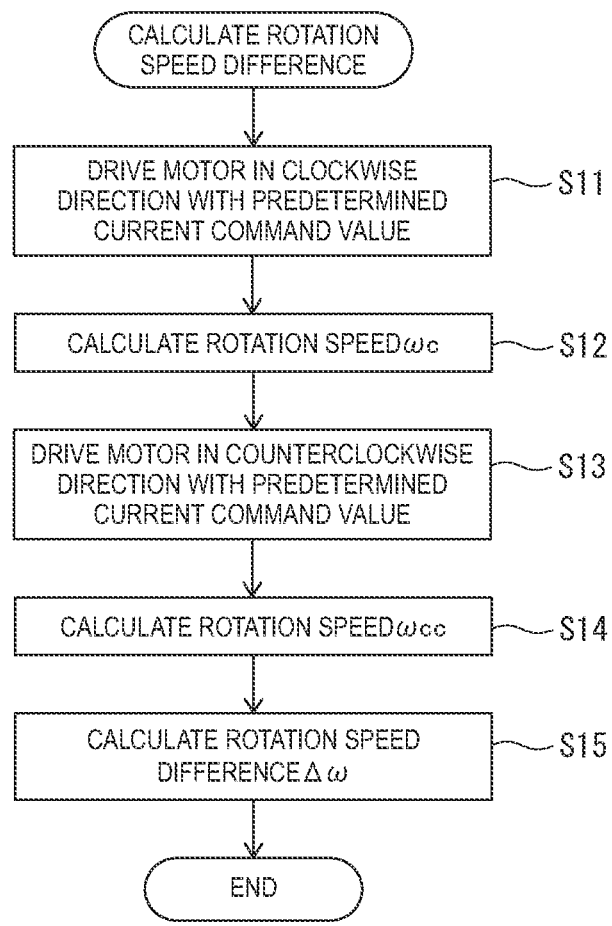
FIG. 11 is a flowchart illustrating an example of a rotation angle difference calculation routine of FIG. 10.

In step S1, the correction unit 31, the motor control unit 32, and the correction value calculation unit 33 calculate the rotation speed difference $\Delta\omega$. FIG. 11 illustrates an example of a rotation speed difference calculation routine of step S1.

In step S11, the correction unit 31 corrects the detection angle θc computed on the basis of the detection signal of the MR sensor element 14 with the value (correction value C) of the correction value data 34 stored in the storage device 22 at the present moment to calculate the corrected rotation angle θa. The motor control unit 32 drives the motor 2 by performing advance angle control for field weakening or the like in the clockwise direction with a predetermined q-axis current command value on the basis of the corrected rotation angle θa.

In step S12, the differentiator 50 of the correction value calculation unit 33 calculates the rotation speed $\omega$c in the clockwise direction.

In step S13, the motor control unit 32 drives the motor 2 by performing advance angle control for field weakening or the like in the counterclockwise direction with a predetermined q-axis current command value on the basis of the corrected rotation angle θa.

In step S14, the differentiator 50 calculates the rotation speed $\omega$cc in the counterclockwise direction.

In step S15, the rotation speed difference calculation unit 51 of the correction value calculation unit 33 calculates the difference ($\omega$cc−$\omega$c) between the rotation speeds $\omega$c and $\omega$cc in the clockwise and counterclockwise directions as rotation speed difference $\Delta\omega$. After that, the rotation speed difference calculation routine is ended.

Figure 10:
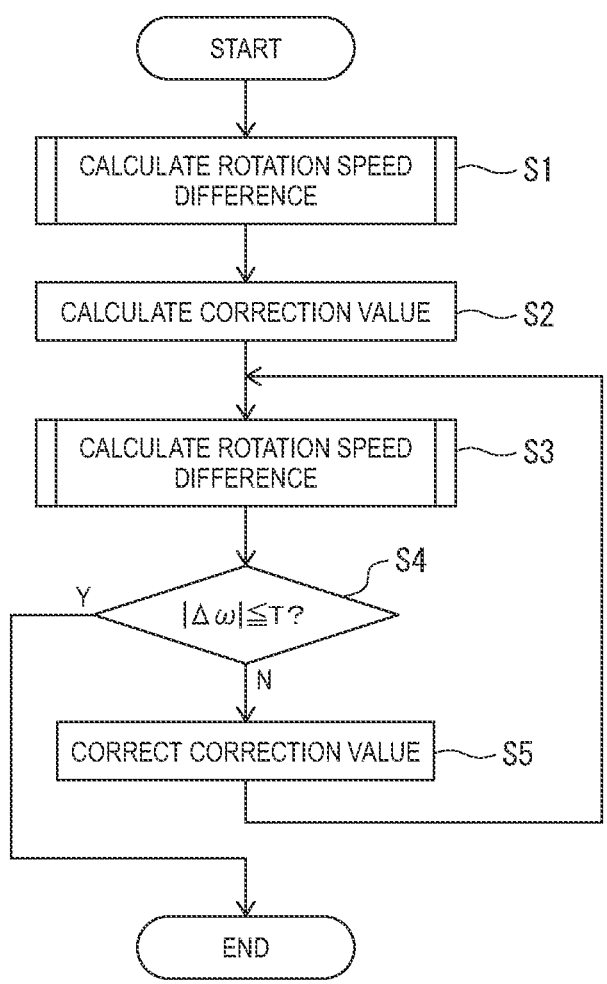
FIG. 10 is a flowchart illustrating an example of a phase adjustment method of the first embodiment.

Reference is made to FIG. 10. In step S2, the calculation unit 52 of the correction value calculation unit 33 calculates the correction value C according to the rotation speed difference $\Delta\omega$. The calculation unit 52 stores the calculated correction value C as the correction value data 34 in the storage device 22.

In step S3, the correction unit 31, the motor control unit 32, and the correction value calculation unit 33 calculate the rotation speed difference $\Delta\omega$. The processing of step S3 is the same as the rotation speed difference calculation routine of step S1.

In step S4, the calculation unit 52 determines whether or not the magnitude $|\Delta\omega|$ the rotation speed difference calculated in step S3 is the predetermined threshold value T or less. When the magnitude $|\Delta\omega|$ of the rotation speed difference is not the predetermined threshold value T or less (step S4: N), processing proceeds to step S5.

In step S5, the calculation unit 52 calculates the angular misalignment amount $\Delta\theta$ according to the rotation speed difference $\Delta\omega$. The calculation unit 52 performs correction to add the calculated angular misalignment amount $\Delta\theta$ to the value (correction value C) of the correction value data 34 stored in the storage device 22 at the present moment.

The calculation unit 52 updates the value (correction value C) of the correction value data 34 stored in the storage device 22 at the present moment with a correction value after the correction. Then, processing returns to step S3.

When the magnitude $|\Delta\omega|$ of the rotation speed difference is the predetermined threshold value T or less (step S4: Y), processing is ended.

(Effects of First Embodiment)

(1) The differentiator 50 measures the rotation speeds $\omega c$ and $\omega cc$ when the motor 2 is driven with the same torque command current to rotate clockwise and counterclockwise, respectively, on the basis of the rotation angle of the rotor of the motor 2 detected by the MR sensor element 14. The calculation unit 52 calculates a correction value to correct the phase of the MR sensor element 14 so that the rotation speed difference $\Delta\omega$ between the rotation speeds $\omega c$ and $\omega cc$ decreases.

This allows phase adjustment of a rotation angle sensor configured to detect a rotation angle of the rotor of a brushless motor to be performed highly accurately without complicated computation.

Note that one possible method to adjust the phase of the rotation angle sensor is to detect a phase of the rotor by using an induced voltage of the motor and adjust a phase difference from the phase of the rotation angle sensor. However, in this method, the motor is rotated at high speed in order to generate a large induced voltage, which increases variation of the induced voltage. Additionally, variation in an induced voltage measurement circuit is also added, so that it is difficult to perform highly accurate adjustment.

Additionally, one possible method to adjust the phase of the rotation angle sensor is to rotate the motor with the same torque command value in the clockwise direction and the counterclockwise direction to detect a phase difference where actual acceleration becomes maximum, and adjust a phase difference from the phase of the rotation angle sensor. However, computing the acceleration from the detection signal of the rotation angle sensor increases noise, so that highly accurate adjustment is difficult.

On the other hand, the phase adjustment method of the present embodiment can increase the current command value and the torque command value when measuring the rotation speed difference $\Delta\omega$, so that a ratio of generated toque of the motor to load torque that limits the rotation speed of the motor can be increased, which enables highly accurate phase adjustment.

In addition, the rotation speed is equivalent to output torque, so that adjusting to reduce the clockwise and counterclockwise rotation speed difference $\Delta\omega$ enables a correction including a clockwise and counterclockwise difference of the load torque of the support member supporting the rotation shaft of the motor. Accordingly, adjustment is possible while the device is incorporated in an actual product. Furthermore, by increasing the time of rotation speed measurement, averaging effect during the measurement is expected to improve accuracy.

(2) The motor control unit 32 performs advance angle control on the basis of the rotation angle of the rotor detected by the MR sensor element 14 when rotating the motor 2 clockwise and counterclockwise to measure the rotation speeds $\omega c$ and $\omega cc$, respectively.

This enables the phase difference between the phase of the rotor and the phase of the rotation angle sensor to be detected as the clockwise and counterclockwise rotation speed difference $\Delta\omega$.

(3) The correction unit 31, the motor control unit 32, and the correction value calculation unit 33 repeat the measurement of the clockwise and counterclockwise rotation speeds $\omega c$ and $\omega cc$ a plurality of times. The motor control unit 32 measures the ith-time rotation speeds $\omega ci$ and $\omega cci$ by driving the motor 2 while correcting the MR sensor element 14 with the correction value $C(i-1)$ calculated according to the rotation speed difference $\Delta\omega$ between the rotation speeds $\omega c$ and $\omega cc$ measured at the $(i-1)$th (i represents an integer of 2 or more) time of the plurality of times of measurement. As a result, the accuracy of the phase adjustment can be improved by performing fine adjustment while gradually decreasing the correction value Ci.

(4) The calculation unit 52 of the correction value calculation unit 33 corrects the correction value C so that the ith-time rotation speed difference $\Delta\omega i$ decreases on the basis of the amount of change between the correction value $C(i-2)$ used to correct the MR sensor element 14 when driving the motor 2 in the $(i-1)$th-time measurement and the correction value $C(i-1)$ used to correct the MR sensor element 14 when driving the motor 2 in the ith-time measurement and the amount of change between the $(i-1)$th-time rotation speed difference $\Delta\omega(i-1)$ and the ith-time rotation speed difference $\Delta\omega i$. This allows the correction value C to be corrected by a simple calculation without using maps and lookup tables even when characteristics of the angular misalignment amount $\Delta\theta$ with respect to the rotation speed difference $\Delta\omega$ have nonlinearity.

Second Embodiment

Next, a second embodiment of the present invention will be described. When the rotation speed difference $\Delta\omega$ calculated from the clockwise and counterclockwise rotation speeds $\omega c$ and $\omega cc$ is large, i.e., when the angular misalignment amount $\Delta\theta$ between the detection angle $\theta c$ computed on the basis of the detection signal of the MR sensor element 14 and the phase of the rotor is large, the time required to calculate the correction value C where the magnitude $|\Delta\omega|$ of the rotation speed difference is the threshold value T or less may increase. Additionally, for example, when the angular misalignment amount $\Delta\theta$ is too large, motor control by the motor control unit 32 may be difficult.

Therefore, the second embodiment first performs a coarse adjustment by obtaining the correction value C on the basis of the detection angle $\theta c$ computed from a detection signal of the MR sensor element 14 when the rotor is rotationally driven to a stable point.

After that, the motor 2 is rotated clockwise and counterclockwise on the basis of the corrected rotation angle $\theta a$ obtained by correcting the detection angle $\theta c$ with the correction value C to measure the rotation speeds $\omega c$ and $\omega cc$, and fine adjustment is performed by correcting the correction value C so that the magnitude $|\Delta\omega|$ of the rotation speed difference between the rotation speeds $\omega c$ and $\omega cc$ decreases.

(Configuration)

Figure 12:
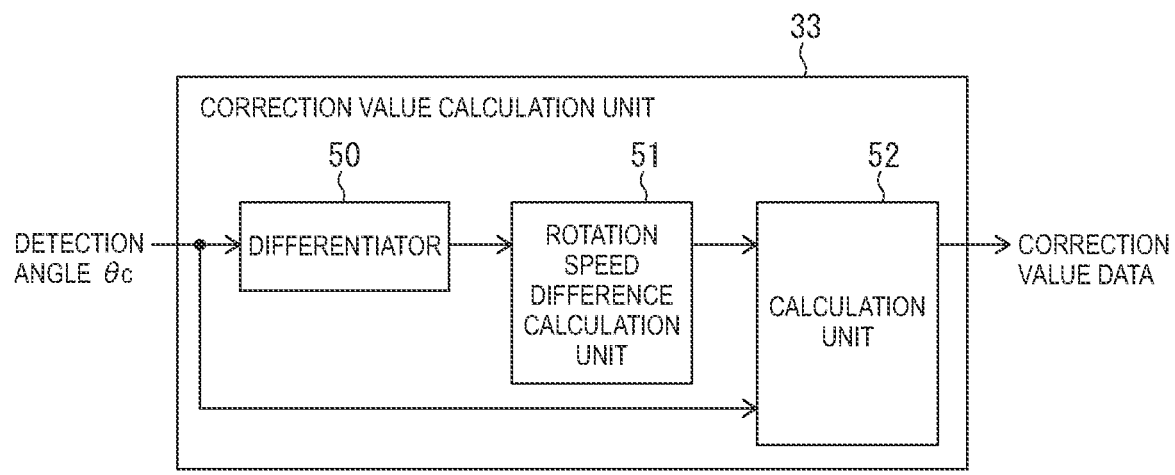
FIG. 12 is an illustrative diagram illustrating an example of a functional configuration of a correction value calculation unit of a second embodiment.

Reference is made to FIG. 12. The correction value calculation unit 33 of the second embodiment has the similar configuration as that of the correction value calculation unit 33 of the first embodiment described with reference to FIG. 9. Therefore, the same components are denoted by the same reference signs, and description thereof will be omitted.

When calculating the correction value C by the correction value calculation unit 33 of the second embodiment, the motor control unit 32 first rotationally drives the motor 2 to a stable point and fix the rotor to the stable point. For example, the motor control unit 32 applies a predetermined current between a U-phase coil, a V-phase coil, and a W-phase coil of the motor 2 to rotationally drive the motor 2 to the stable point. For example, the motor control unit 32 applies 2×a [A] to the U-phase coil and (−a) [A] to each of the V-phase coil and the W-phase coil.

In this state, the correction value calculation unit 33 reads a detection angle θcs computed from a detection signal of the MR sensor element 14. The calculation unit 52 of the correction value calculation unit 33 calculates an initial value C0 of the correction value C on the basis of a relationship between an angle of the rotor when fixed to the stable point and a rotor-side rotation angle reference and the detection angle θcs.

For example, the calculation unit 52 calculates as the initial value C0 a difference (θcs−Δθs) obtained by subtracting a difference Δθs between the angle of the rotor when fixed to the stable point and the rotor-side rotation angle reference from the detection angle θcs. The calculation unit 52 stores the initial value C0 as the correction value data 34 in the storage device 22.

Next, the motor control unit 32 rotates the motor 2 in the clockwise direction and the counterclockwise direction on the basis of the corrected rotation angle θa obtained by correcting the detection angle θc with the correction value C0.

The calculation unit 52 calculates the angular misalignment amount Δθ on the basis of the rotation speed difference Δω. The angular misalignment amount Δθ is an angular misalignment amount between the corrected rotation angle θa obtained by correcting the detection angle θc with the correction value C0 and the phase of the rotor. Accordingly, the calculation unit 52 performs correction to add the angular misalignment amount Δθ to the correction value C0, thereby calculating the correction value C. The calculation unit 52 updates the correction value C0 stored in the storage device 22 with the correction value C after the correction.

The series of steps including the step of measuring the rotation speeds ωc and ωcc, the step of calculating the rotation speed difference Δω, and the step of calculating the correction value C may be repeated a plurality of times. Alternatively, the series of steps described above may be repeated a plurality of times until the magnitude |Δω| of the rotation speed difference Δω becomes the predetermined threshold value T or less.

When calculating a first-time correction value C1, the motor 2 is rotated in the clockwise direction and the counterclockwise direction on the basis of the corrected rotation angle θa obtained by correcting the detection angle θc with the correction value C0 calculated by fixing the rotor to the stable point.

The calculation unit 52 calculates an angular misalignment amount Δθ1 on the basis of the first-time rotation speed difference Δω1. The calculation unit 52 performs correction to add the angular misalignment amount Δθ1 to the correction value C0, thereby calculating the first-time correction value C1. The calculation unit 52 updates the correction value C0 stored in the storage device 22 with the correction value C1 after the correction.

After that, the rotation speed difference Δωi at the ith time that is the second or later time is calculated in the same manner as in the first embodiment.

(Operation)

Figure 13:
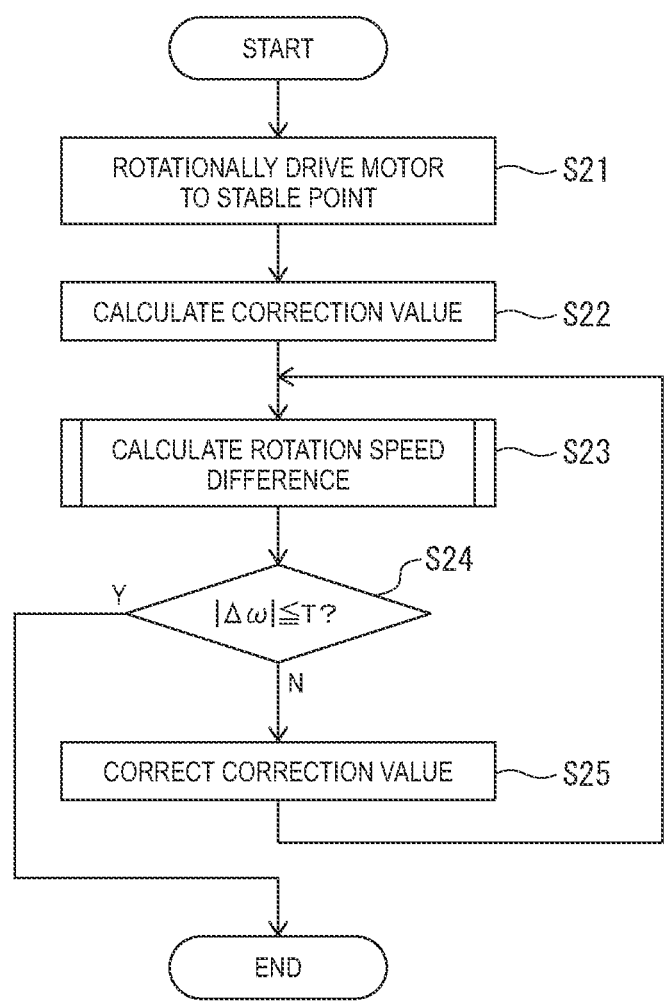
FIG. 13 is a flowchart illustrating an example of a phase adjustment method of the second embodiment.

Next, an example of a phase adjustment method of the second embodiment will be described with reference to FIG. 13.

In step S21, the motor control unit 32 first rotationally drives the motor 2 to a stable point and fixes the rotor to the stable point.

In step S22, the correction value calculation unit 33 reads the detection angle θcs computed from a detection signal of the MR sensor element 14. The calculation unit 52 of the correction value calculation unit 33 calculates the initial value C0 of the correction value C on the basis of a relationship between an angle of the rotor when fixed to the stable point and a rotor-side rotation angle reference and the detection angle θcs. The calculation unit 52 stores the initial value C0 as the correction value data 34 in the storage device 22.

In step S23, the correction unit 31, the motor control unit 32, and the correction value calculation unit 33 calculate the rotation speed difference Δω. The processing of step S23 is the same as the rotation speed difference calculation routine of step S1 of FIG. 10.

Pieces of processing of steps S24 and S25 thereafter are the same as the pieces of processing of steps S4 and S5 of FIG. 10.

(Effects of Second Embodiment)

The calculation unit 52 of the correction value calculation unit 33 calculates the correction value C on the basis of the detection angle θcs computed from the detection signal of the MR sensor element 14 when the rotor of the motor 2 is rotationally driven to the stable point. The motor control unit 32 rotates the motor 2 in the clockwise direction and the counterclockwise direction on the basis of the corrected rotation angle θa obtained by correcting the detection angle θc with the correction value C. The calculation unit 52 corrects the correction value C so that the rotation speed difference Δω decreases.

In this way, by performing the coarse adjustment on the basis of the detection signal of the MR sensor element 14 when the rotor of the motor 2 is rotationally driven to the stable point, the time required to adjust the phase of the MR sensor element 14 can be shortened.

Additionally, the phase adjustment can be performed even when the phase difference between the phase of the MR sensor element 14 and the phase of the rotor is large and motor control by the motor control unit 32 is difficult.

(Application Example of Motor Control Device)

Figure 14:
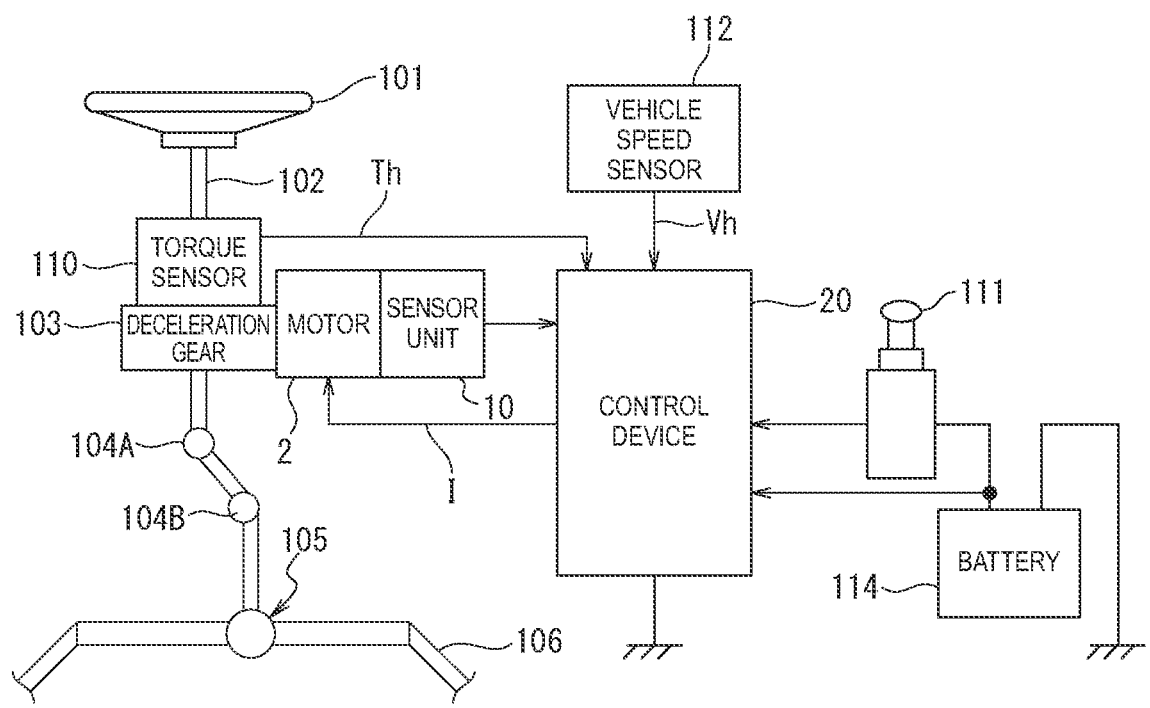
FIG. 14 is a configuration diagram illustrating an overview of an example of an electric power steering device including the motor control device of the embodiment.

Next, FIG. 14 will be referenced to describe a configuration example in which the motor control device 1 of the present embodiment applied to an electric power steering device configured to control a steering assistance force applied to a vehicle steering system.

A column shaft 102 of a steering handle 101 is connected to tie rods 106 of steered wheels via a deceleration gear 103, universal joints 104A and 104B, and a pinion rack mechanism 105. The column shaft 102 is provided with a torque sensor 110 that detects a steering torque Th of the steering handle 101, and the motor 2, which assists a steering force of the steering handle 101, is connected to the column shaft 102 via the deceleration gear 103.

The control device 20 described above is used as an electronic control unit that controls the power steering device. The control device 20 receives electric power from a battery 114 serving as a power source, and also receives an ignition key signal from an ignition key 111.

The control device 20 computes a steering angle θ of the steering handle 101 on the basis of the rotation angle θm of the motor 2 computed as described above and a deceleration ratio N of the deceleration gear 103. The control device 20 uses an assist map or the like to compute a steering assistance command value of an assist command on the basis of the steering angle θ, the steering torque Th, and a vehicle speed Vh detected by a vehicle speed sensor 112, and controls a current I to be supplied to the motor 2 on the basis of the computed steering assistance command value.

In the electric power steering device thus configured, the torque sensor 110 detects the steering torque Th applied by a driver's steering handle operation transmitted from the steering handle 101, the steering angle θ is computed on the basis of the rotation angle θm of the motor 2, and the motor 2 is driven and controlled by the steering assistance command value calculated on the basis of the steering torque Th, the steering angle θ, and the vehicle speed Vh. The drive is applied as an assistance force (a steering assistance force) for the driver's steering handle operation to the steering system.

REFERENCE SIGNS LIST

1: Motor control device
2: Motor
3: Rotation shaft
4: Output end
5: End portion
10: Sensor unit
11: Magnet
12: Circuit board
13: Support member
14: MR sensor element
15: Harness
20: Control device
21: Processor
22: Storage device
23, 24: Analog-digital converter (ADC)
25: Driver circuit
26: Current sensor
27: Interface (I/F) circuit
30: Rotation angle measurement unit
31: Correction unit
32: Motor control unit
33: Correction value calculation unit
34: Correction value data
35: Adder
36, 44, 45: Subtractor
37: Computation unit
40: Torque command value computation unit
41, 50: Differentiator
42: Current command value computation unit
46, 47: Proportional integration (PI) control unit
48: two-phase/three-phase conversion unit
49: Pulse width modulation (PWM) control unit
51: Rotation speed difference calculation unit
52: Calculation unit

The invention claimed is:

1. A phase adjustment method for a rotation angle sensor configured to detect a rotation angle of a rotor of a brushless motor, the phase adjustment method comprising: measuring a first rotation speed and a second rotation speed when the brushless motor is driven with a same torque command current to rotate clockwise and counterclockwise, respectively, on a basis of the rotation angle of the rotor detected by the rotation angle sensor; calculating a rotation speed difference between a first rotation speed and a second rotation speed; and calculating a correction value to correct a phase of the rotation angle sensor based on the calculated rotation speed difference and a known characteristic between a misalignment amount between a phase of the rotation angle sensor and a phase of the rotor with respect to the rotation speed difference.

2. The phase adjustment method according to claim 1, wherein when rotating the brushless motor clockwise and counterclockwise to measure the first rotation speed and the second rotation speed, respectively, advance angle control is performed on the basis of the rotation angle of the rotor detected by the rotation angle sensor.

3. The phase adjustment method according to claim 1, wherein after obtaining the correction value on a basis of a detection value of the rotation angle sensor when the rotor is rotationally driven to a stable point, the brushless motor is rotated clockwise and counterclockwise, and the correction value is corrected so that the rotation speed difference between the first rotation speed and the second rotation speed decreases.

4. The phase adjustment method according to claim 1, wherein the measurement of the first rotation speed and the second rotation speed is repeated a plurality of times, and the first rotation speed and the second rotation speed at an ith time are measured by driving the brushless motor while correcting the rotation angle sensor with the correction value calculated according to the first rotation speed and the second rotation speed measured at an (i−1)th (i represents an integer of 2 or more) time of the plurality of times of measurement.

5. The phase adjustment method according to claim 4, wherein on a basis of an amount of change between the correction value used to correct the rotation angle sensor when driving the brushless motor in the (i−1)th-time measurement and the correction value used to correct the rotation angle sensor when driving the brushless motor in the ith-time measurement and an amount of change between the rotation speed difference between the first rotation speed and the second rotation speed measured at the (i−1)th time and the rotation speed difference between the first rotation speed and the second rotation speed measured at the ith time, the correction value is corrected so that the rotation speed difference between the first rotation speed and the second rotation speed measured at the ith time decreases.

6. A correction value calculation device configured to calculate a correction value to adjust a phase of a rotation angle sensor configured to detect a rotation angle of a rotor of a brushless motor, the correction value calculation device comprising: a motor control unit configured to drive the brushless motor on a basis of the rotation angle of the rotor detected by the rotation angle sensor; a rotation speed difference calculation unit configured to calculate a rotation speed difference between a first rotation speed and a second rotation speed when the brushless motor is driven with a same torque command current by the motor control unit to rotate clockwise and counterclockwise, respectively; and a calculation unit configured to calculate the correction value to correct the phase of the rotation angle sensor so that based on the calculated rotation speed difference and a known characteristic between a misalignment amount between a phase of the rotation angle sensor and a phase of the rotor with respect to the rotation speed difference.

7. A motor control device comprising a rotation angle sensor configured to detect a rotation angle of a rotor of a brushless motor and the correction value calculation device according to claim 6 configured to calculate a correction value to adjust a phase of the rotation angle sensor, wherein the motor control unit of the correction value calculation device corrects the rotation angle sensor according to the correction value calculated by the calculation unit, and drives the brushless motor.

8. An electric actuator product comprising the motor control device according to claim 7 and a brushless motor controlled by the motor control device.

9. An electric power steering device comprising the motor control device according to claim 7 and a brushless motor controlled by the motor control device, the brushless motor applying a steering assistance force to a vehicle steering system.

\* \* \* \* \*